(12) United States Patent
Sakamoto et al.

(10) Patent No.: US 9,732,674 B2
(45) Date of Patent: Aug. 15, 2017

(54) FLOW PATH STRUCTURE AND GAS TURBINE EXHAUST DIFFUSER

(75) Inventors: Yasuro Sakamoto, Tokyo (JP); Eisaku Ito, Tokyo (JP); Susumu Wakazono, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 1026 days.

(21) Appl. No.: 13/991,796

(22) PCT Filed: Dec. 24, 2010

(86) PCT No.: PCT/JP2010/073278
§ 371 (c)(1),
(2), (4) Date: Jun. 5, 2013

(87) PCT Pub. No.: WO2012/086044
PCT Pub. Date: Jun. 28, 2012

(65) Prior Publication Data
US 2013/0259670 A1    Oct. 3, 2013

(51) Int. Cl.
*F02C 7/00*       (2006.01)
*F01D 25/30*   (2006.01)
*F01D 5/14*     (2006.01)
*F01D 25/16*   (2006.01)

(52) U.S. Cl.
CPC ............... *F02C 7/00* (2013.01); *F01D 5/143* (2013.01); *F01D 25/162* (2013.01); *F01D 25/30* (2013.01); *F05D 2250/712* (2013.01)

(58) Field of Classification Search
CPC ........................... F01D 5/143; F05D 2250/712
See application file for complete search history.

(56) References Cited

U.S. PATENT DOCUMENTS

| 5,397,215 A | 3/1995 | Spear et al. |
| 6,017,186 A | 1/2000 | Hoeger et al. |
| 6,126,394 A | 10/2000 | Matsuda |

(Continued)

FOREIGN PATENT DOCUMENTS

| CH | 229266 A | 10/1943 |
| CN | 1191930 A | 9/1998 |

(Continued)

OTHER PUBLICATIONS

Japanese Office Action dated May 7, 2014, issued in Japanese Patent Application No. 2013-177341, w/English translation (6 pages).

(Continued)

*Primary Examiner* — Gregory Anderson
*Assistant Examiner* — Michael Sehn
(74) *Attorney, Agent, or Firm* — Westerman, Hattori, Daniels & Adrian, LLP

(57) ABSTRACT

A flow path structure includes a wall surface in which a flow path is formed, a structure configured to extend in a direction intersecting a main stream direction of a fluid flowing through the flow path from the wall surface, and a concave section forming region formed throughout a range including the structure in the main stream direction and having a concave section formed in the wall surface. As the structure occupies a partial range of the flow path in the flow path cross section intersecting the main stream, a cross-sectional area of the flow path is varied in accordance with positional variation in the main stream direction.

8 Claims, 5 Drawing Sheets

(56) References Cited

U.S. PATENT DOCUMENTS

| | | | |
|---|---|---|---|
| 6,561,761 | B1 | 5/2003 | Decker et al. |
| 2005/0050898 | A1 | 3/2005 | Noda |
| 2006/0099070 | A1 | 5/2006 | Suciu et al. |
| 2007/0258818 | A1 | 11/2007 | Allen-Bradley et al. |

FOREIGN PATENT DOCUMENTS

| | | | |
|---|---|---|---|
| CN | 1506560 | A | 6/2004 |
| EP | 1428985 | A1 | 6/2004 |
| EP | 1681438 | A2 | 7/2006 |
| EP | 2 136 033 | A1 | 12/2009 |
| FR | 1 602 965 | A | 3/1971 |
| JP | 4-121495 | U | 10/1992 |
| JP | 6-173707 | A | 6/1994 |
| JP | 6-193466 | A | 7/1994 |
| JP | 6-257597 | A | 9/1994 |
| JP | 7-247996 | A | 9/1995 |
| JP | 10-502150 | A | 2/1998 |
| JP | 11-190299 | A | 7/1999 |
| JP | 2000-274202 | A | 10/2000 |
| JP | 2001-271792 | A | 10/2001 |
| JP | 2002-276301 | A | 9/2002 |
| JP | 2003-517130 | A | 5/2003 |
| JP | 3416210 | B2 | 6/2003 |
| JP | 2004-190664 | A | 7/2004 |
| JP | 2006-138319 | A | 6/2006 |

OTHER PUBLICATIONS

Chinese Office Action dated Dec. 26, 2014, issued in corresponding CN Patent Application No. 201080070787.9 with English translaiton (14 pages).
Notice of Allowance dated Nov. 4, 2015, issued in counterpart Japanese Patent Application No. 2014139971, w/English translation (6 pages).
International Search Report of PCT/JP2010/073278, date of mailing Feb. 15, 2011.
Written Opinion of PCT/JP2010/073278, date of mailing Feb. 15, 2011.
Japanese Office Action dated Oct. 23, 2012, issued in corresponding Japanese Patent Application No. 2009-178282, w/ English translation.
Japanese Office Action dated Jul. 2, 2013, issued in corresponding Japanese Patent Application No. 2009-178282, w/ English translation.
Office Action dated Mar. 17, 2015, issued in corresponding Japanese Patent Application No. 2014-139971 with English translation (6 pages).
Extended (Supplementary) European Search Report dated Apr. 4, 2017, issued in counterpart European Patent Application No. 10861150.0. (7 pages).

FLOW PATH STRUCTURE AND GAS TURBINE EXHAUST DIFFUSER

TECHNICAL FIELD

The present invention relates to a flow path structure and a gas turbine exhaust diffuser.

BACKGROUND ART

As is well known, as a type of flow path structure, a structure extending from a wall surface forming a flow path in a direction intersecting a main stream direction along a main stream of a fluid flowing through the flow path is known. For example, in a kind of exhaust diffuser of a gas turbine, while a bearing configured to support a rotor is installed in an exhaust casing and an annular space around the bearing becomes an exhaust flow path, a strut extending from an exhaust casing and configured to hold the bearing is disposed in the annular space (Patent Literature 1).

CITATION LIST

Patent Literature

[Patent Literature 1] Japanese Unexamined Patent Application, First Publication No. 2004-190664

SUMMARY OF INVENTION

Problem to be Solved by the Invention

Here, in the flow path structure, since a flow path cross-sectional area is varied, a pressure loss may occur.

For example, in the kind of exhaust diffuser of the above-mentioned gas turbine, in a strut disposition range in a main stream direction of an exhaust, as the strut occupies a partial range of a flow path in a flow path cross section, a cross-sectional area of the flow path is abruptly reduced and then increased in accordance with a positional variation from an upstream side toward a downstream side of the exhaust main stream. For this reason, when the exhaust passes through the strut disposition range, a relatively large pressure loss occurs.

In consideration of the above-mentioned circumstances, it is an object of the present invention to provide a flow path structure and a gas turbine exhaust diffuser that are capable of suppressing generation of a pressure loss and thus improving the performance of a gas turbine.

Means for Solving the Problem

A flow path structure of the present invention is a flow path structure in which a structure extends in a direction intersecting a main stream direction along a main stream of a fluid flowing through a flow path from a wall surface in which the flow path is formed, and as the structure in a flow path cross section intersecting the main stream occupies a partial range of the flow path, a cross-sectional area of the flow path is varied in accordance with positional variation in the main stream direction, and including a concave section forming region formed throughout the structure in the main stream direction and having a concave section formed in the wall surface. That is, the flow path structure includes a wall surface in which a flow path is formed; a structure configured to extend in a direction intersecting a main stream direction of a fluid flowing through the flow path from the wall surface; and a concave section forming region formed throughout a range comprising the structure in the main stream direction and having a concave section formed in the wall surface. As the structure occupies a partial range of the flow path in the flow path cross section intersecting the main stream, a cross-sectional area of the flow path is varied in accordance with positional variation in the main stream direction.

According to the present invention, since the concave section is formed in the wall surface throughout the concave section forming region including the structure in the main stream direction, in comparison with the case in which the concave section is not formed, the cross-sectional area of the flow path is increased in proportion to the concave section. That is, in the range in which the structure in the main stream direction is formed, at least a portion of a decrement in cross-sectional area by the structure can be offset by an increment in cross-sectional area by the concave section. Accordingly, since the variation in cross-sectional area is attenuated in comparison with the case in which the concave section is not formed, generation of a pressure loss can be suppressed.

Further, in the upstream side and the downstream side of the structure in the main stream direction, in comparison with the case in which the concave section is not formed, since the cross-sectional area of the flow path is increased, an influence on a pressure variation at the front edge and the rear edge of the structure can be attenuated.

In addition, the concave section may be configured to include a position in the flow path cross section from which the structure of the wall surface extends.

According to the present invention, a cross-sectional area of a partial region including the structure in the flow path cross section can be increased. Accordingly, in comparison with the case in which the concave section in the flow path cross section is formed at a position spaced apart from the structure, since the fluid colliding with the structure can rapidly escape to the concave section, the pressure loss can be effectively decreased.

Further, in the front edge upstream side and the rear edge downstream side of the structure in the main stream direction, in comparison with the case in which the concave section is not formed, since the cross-sectional area of the flow path is partially increased, an influence on the pressure variation at the front edge and the rear edge of the structure can be largely attenuated.

In addition, the concave section may be configured such that a portion of a trajectory of a variation in cross-sectional area of the flow path in accordance with positional variation in the main stream direction within a range where the structure is provided is disposed between a trajectory of the variation in cross-sectional area of the flow path in case that the structure and the concave section are not prepared and a trajectory of the variation in cross-sectional area of the flow path in case that the concave section is not prepared.

According to the present invention, since the variation in cross-sectional area of the flow path is approximate to the variation in cross-sectional area of the flow path in case that the structure is not prepared, a pressure loss can be effectively suppressed.

In addition, the concave section may be formed at a range from a position of an upstream side spaced a distance of 0.4 L from a front edge to a position of a downstream side spaced a distance of 0.4 L from a rear edge when a length from the front edge to the rear edge of the structure in the main stream direction is L.

According to the present invention, a pressure loss can be effectively suppressed.

Further, the concave section may be formed at a range from a position of the upstream side spaced a distance of 0.2 L from the front edge and a position of the downstream side spaced a distance of 0.2 L from the rear edge.

According to the present invention, a pressure loss can be effectively suppressed.

A gas turbine exhaust diffuser of the present invention has the above-mentioned flow path structure. According to the present invention, performance of the diffuser can be improved by an action of the flow path structure.

Effects of the Invention

According to the flow path structure and the gas turbine exhaust diffuser of the present invention, generation of a pressure loss can be suppressed, and thus performance of the gas turbine can be improved.

DESCRIPTION OF EMBODIMENTS

Hereinafter, an embodiment of the present invention will be described with reference to the accompanying drawings.

Figure 1:
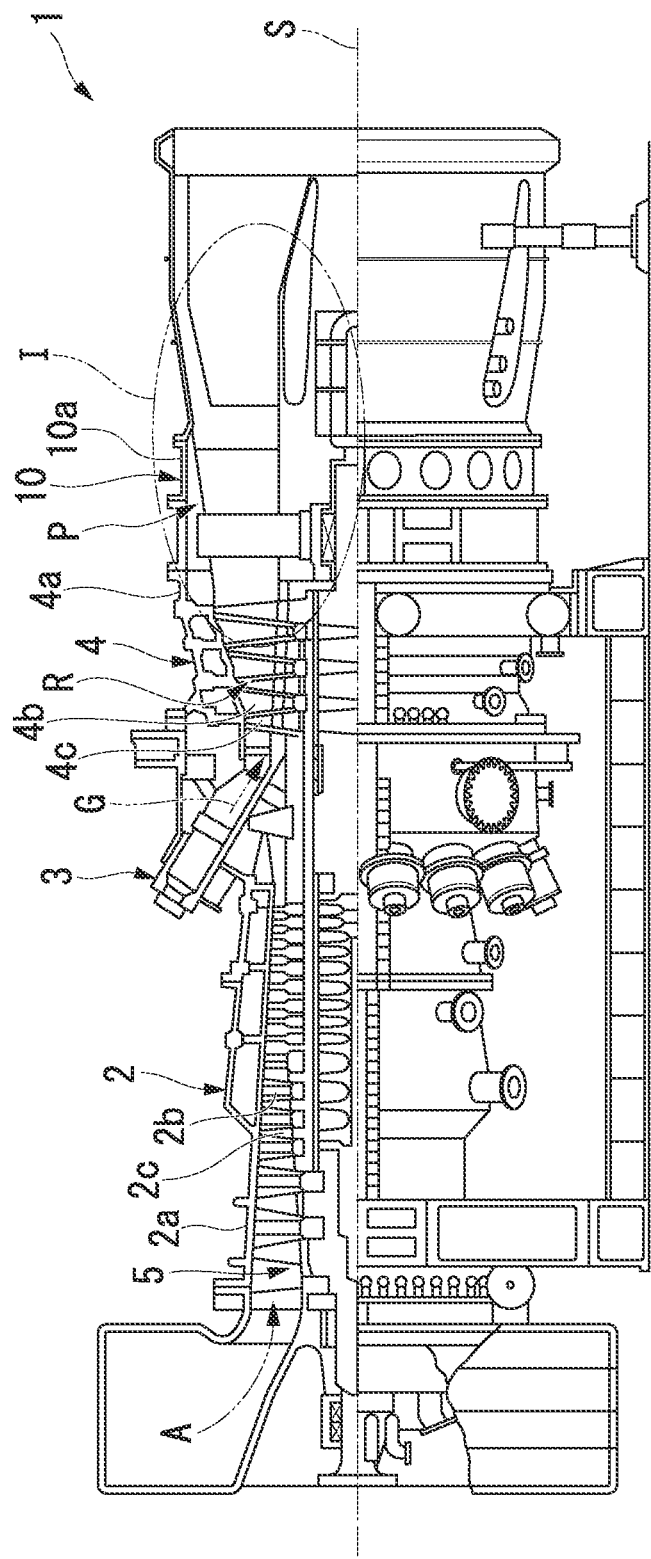
FIG. 1 is a half cross-sectional view showing a schematic configuration of a gas turbine 1 according to an embodiment of the present invention.

FIG. 1 is a half cross-sectional view showing a gas turbine 1 according to the embodiment of the present invention.

As shown in FIG. 1, the gas turbine 1 includes a compressor 2, a combustor 3 and a turbine 4. A rotor 5 is inserted into a compressor casing 2a of the compressor 2 and a turbine casing 4a of the turbine 4.

The compressor 2 has a blade row constituted by stationary compressor blades 2b annularly arranged along an inner circumference of the compressor casing 2a and a blade row constituted by moving compressor blades 2c annularly arranged along an outer circumference of the rotor 5, the stationary blades 2b and the moving blades 2c being alternately disposed in a rotational center axis S direction. A compression flow path is formed to pass through these blade rows. The blade row constituted by the moving compressor blades 2c and the blade row constituted by the stationary compressor blades 2b are multi-stage structures, each stage constituted by a pair of blade rows neighboring in the rotational center axis S direction.

The compressor 2 adiabatically compresses air A introduced thereinto from an upstream side toward a downstream side of a compression flow path.

The combustor 3 is disposed between the compressor 2 and the turbine 4, and a fuel is mixed with a high pressure air A compressed in the compressor 2 to be combusted to generate a combustion gas G. The combustion gas G is supplied to the turbine 4.

The turbine 4 has a blade row constituted by stationary turbine blades 4b annularly arranged along an inner circumference of the turbine casing 4a and a blade row constituted by moving turbine blades 4c annularly arranged along an outer circumference of the rotor 5, the stationary blades 4b and the moving blades 4c being alternately disposed in the rotational center axis S direction. A combustion gas flow path R is formed to pass through these blade rows. The blade row constituted by the moving turbine blades 4c and the blade row constituted by the stationary turbine blades 4b are multi-stage structures, each stage constituted by a pair of blade rows neighboring in the rotational center axis S direction.

The turbine 4 converts thermal energy of the combustion gas G into rotational energy of a mechanical work via the rotor 5 by expanding the combustion gas G generated by the combustor 3 and allowing the expanded gas to flow toward a downstream side.

The rotor 5 is inserted into the compressor casing 2a and the turbine casing 4a as described above, one end thereof is further connected to a generator (not shown), and the rotational energy generated by the turbine 4 is supplied to the generator as power.

The gas turbine 1 includes an exhaust diffuser 10 connected to a downstream side of the turbine moving blade 4c of a final stage of the turbine casing 4a.

Figure 2:
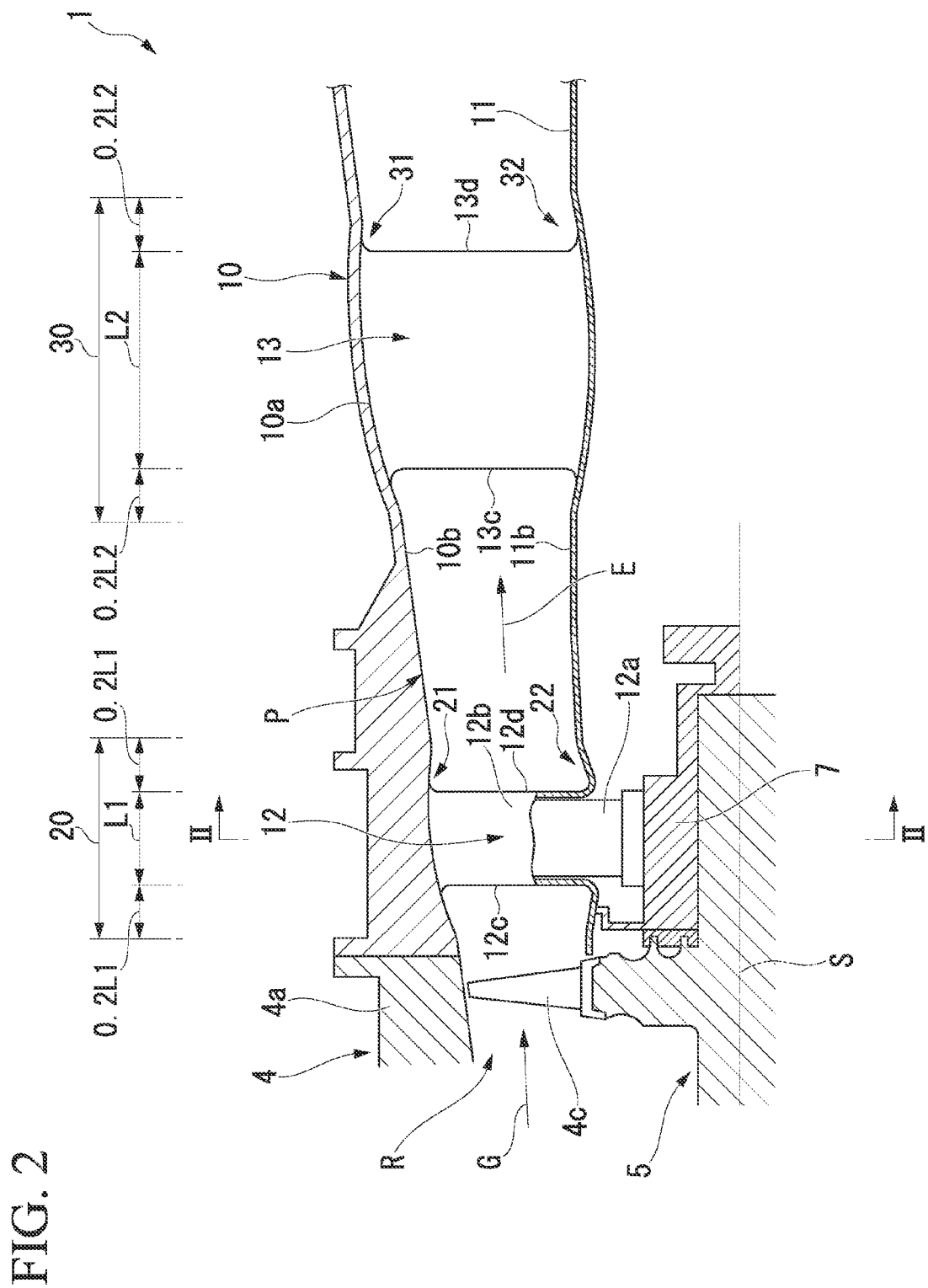
FIG. 2 is an enlarged cross-sectional view of a major part of the gas turbine 1 according to the embodiment of the present invention, showing a major part I of FIG. 1.
Figure 3:
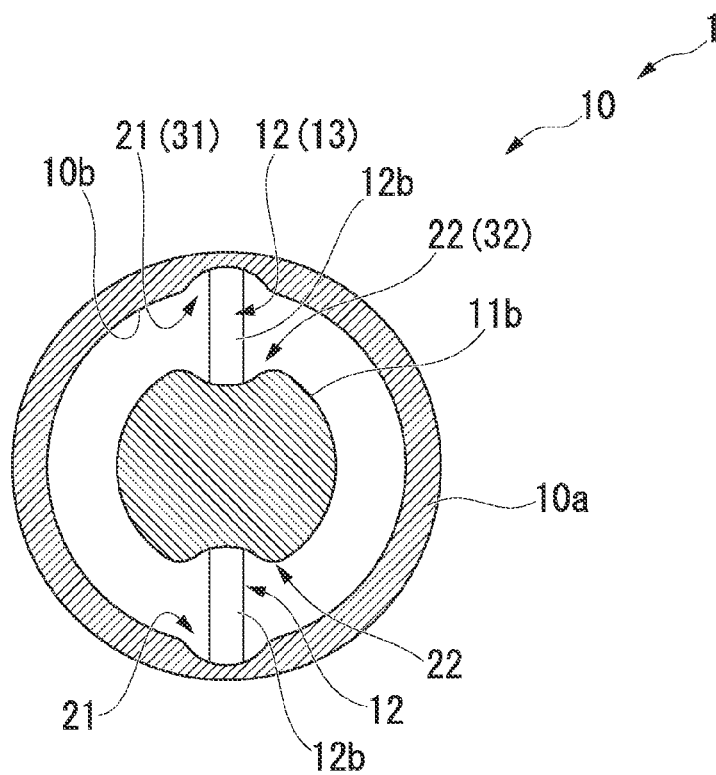
FIG. 3 is an enlarged cross-sectional view of a major part of an exhaust diffuser 10 according to the embodiment of the present invention, showing a cross-sectional view taken along line II-II of FIG. 2.

FIG. 2 is an enlarged cross-sectional view showing a major part I of FIG. 1, and FIG. 3 is a cross-sectional view taken along line II-II of FIG. 2.

As shown in FIG. 2, the exhaust diffuser 10 includes an exhaust casing 10a, a cylindrical protection casing 11, a plurality of struts (structures) 12, and a manhole (a structure) 13. The exhaust casing 10a is connected to the turbine casing 4a. The protection casing 11 is installed in the exhaust casing 10a, and a journal bearing 7 or the like configured to axially support the rotor 5 is accommodated in the protection casing 11. The strut 12 extends from the exhaust casing 10a to the inside of the protection casing 11, and comes in contact with the surroundings of the journal bearing 7 to hold the same bearing 7. The manhole 13 is installed to perform maintenance of the journal bearing 7 or the like, and disposed at a downstream side of the strut 12.

In addition, in the exhaust diffuser 10, the rotational center axis S direction substantially coincides with a direction in which a main stream of an exhaust gas E flows.

In the exhaust casing 10a, an inner circumference wall surface (a wall surface) 10b is gradually increased in diameter from an upstream side, to which the turbine 4 is connected, to a downstream side in a main stream direction.

The protection casing 11 is concentrically installed at the exhaust diffuser 10, and formed to have substantially the same diameter from the upstream side, to which the turbine 4 is connected, to the downstream side in the main stream direction.

An annular exhaust flow path P is formed at the inner circumference wall surface 10b of the exhaust casing 10a and an outer circumference wall surface 11b of the protection casing 11 between the exhaust casing 10a and the protection casing 11. Since the exhaust flow path P is gradually increased in diameter as the outer circumference wall surface 11b of the protection casing 11 has substantially the same diameter and the inner circumference wall surface 10b of the exhaust casing 10a advances toward the downstream side, a cross-sectional area intersecting the main stream direction is gradually increased from the upstream side toward the downstream side in the main stream direction (see FIG. 4).

Each of the struts 12 includes a strut main body 12a configured to hold the journal bearing 7, and a strut cover 12b configured to shield the strut main body 12a from the combustion gas G and protect the strut main body 12a from heating. The strut cover 12b extends from the protection casing 11 toward the exhaust casing 10a.

The manhole 13 is in communication with the outside of the exhaust casing 10a and the inside (an accommodating space) of the protection casing 11.

The strut cover 12b and the manhole 13 extend in a direction intersecting the main stream and have a cross-sectional shape formed in an aerofoil profile (a streamline shape) to reduce a resistance of the main stream in the exhaust flow path P.

As shown in FIG. 2, the exhaust casing 10a has an upstream concave section forming region (a concave section forming region) 20 and a downstream concave section forming region (a concave section forming region) 30.

An upstream-side inner circumference concave section (a concave section) 21 formed in the inner circumference wall surface 10b of the exhaust casing 10a and an upstream-side outer circumference concave section (a concave section) 22 formed in the outer circumference wall surface (a wall surface) 11b of the protection casing 11 are formed throughout a range including the strut 12 in the main stream direction of the upstream concave section forming region 20.

As shown in FIG. 3, these upstream concave sections (the upstream-side inner circumference concave section 21 and the upstream-side outer circumference concave section 22) are formed throughout a range including positions from which the struts 12 extend of the inner circumference wall surface 10b and the outer circumference wall surface 11b in a flow path cross section.

As shown in FIG. 2, these upstream concave sections gradually deepen and then gradually become shallow from one side toward the other side in the main stream direction. In addition, as shown in FIG. 3, these upstream concave sections gradually deepen and then gradually become shallow from one side toward the other side in the circumferential direction.

In addition, when these upstream concave sections have a length of L1 in the main stream direction of the strut 12, the positions extending in the main stream direction are set as will be described below. That is, in the main stream direction, these upstream concave sections extend from positions of the upstream side spaced 0.2 L1 from the strut front edge 12c disposed at the most upstream side of the strut 12 to positions of the downstream side spaced 0.2 L1 from a strut rear edge 12d disposed at the most downstream side of the strut 12.

As shown in FIG. 2, a downstream-side inner circumference concave section (a concave section) 31 formed in the inner circumference wall surface 10b and a downstream-side outer circumference concave section (a concave section) 32 formed in the outer circumference wall surface 11b are formed in the downstream concave section forming region 30 throughout a range including the manhole 13 in the main stream direction.

These downstream concave sections (the downstream-side inner circumference concave section 31 and the downstream-side outer circumference concave section 32) are formed throughout a range including a position from which the manhole 13 extends in the flow path cross section (see FIG. 3).

In addition, these downstream concave sections gradually deepen and then gradually become shallow in the main stream direction as shown in FIG. 2, and then gradually deepen and then gradually become shallow in the circumferential direction as shown in FIG. 3.

When a length in the main stream direction of the manhole 13 is L2, these downstream concave sections extend from positions of the upstream side spaced 0.2 L2 from a manhole front edge 13c disposed at the most upstream side of the manhole 13 to positions of the downstream side spaced 0.2 L2 from a manhole rear edge 13d disposed at the most downstream side of the manhole 13 in the main stream direction.

Figure 4:
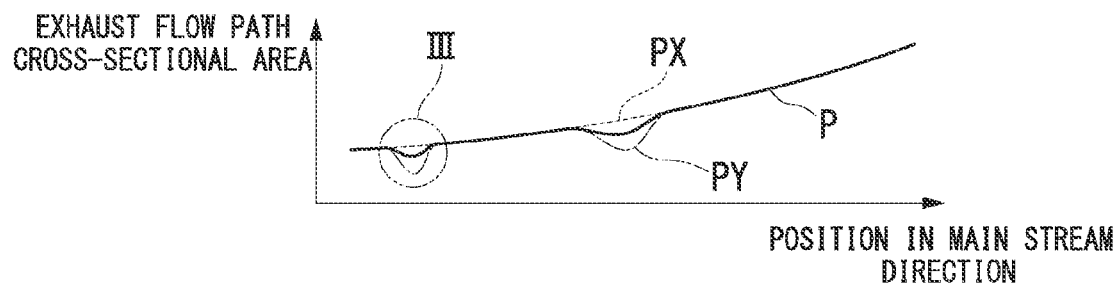
FIG. 4 is a line graph showing a variation in cross-sectional area of an exhaust flow path P of the exhaust diffuser 10 according to the embodiment of the present invention, a horizontal axis representing a position in a main stream direction and a vertical axis representing a cross-sectional area of the exhaust flow path P.
Figure 5:
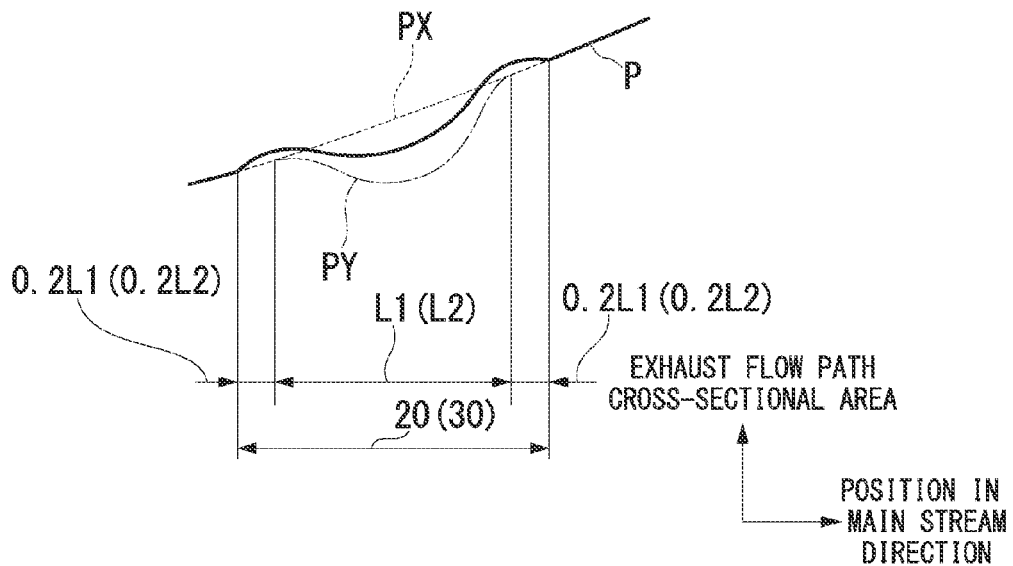
FIG. 5 is a line graph showing a variation in cross-sectional area of the exhaust flow path P of the exhaust diffuser 10 according to the embodiment of the present invention, showing an enlarged view of a major part III of FIG. 4.

FIG. 4 is a line graph showing a variation in cross-sectional area of the exhaust flow path P of the exhaust diffuser 10, and FIG. 5 is an enlarged view of a major part III of FIG. 4. In addition, in FIG. 4, a horizontal axis represents a position in the main stream direction, and a vertical axis represents a cross-sectional area of the exhaust flow path P. Further, in FIGS. 4 and 5, a trajectory shown in a solid line represents the exhaust flow path P, a trajectory shown in a broken line represents a variation in cross-sectional area of a first provisional flow path PX in case that the strut 12 and the manhole 13 as well as the upstream concave section forming region 20 and the downstream concave section forming region 30 are not prepared, and a trajectory shown in a chain line represents a variation in cross-sectional area of a second provisional flow path PY in case that the upstream concave section forming region 20 and the downstream concave section forming region 30 are not prepared.

As shown in FIG. 4, the upstream concave section and the downstream concave section have depths such that a central portion of a trajectory of a variation in cross-sectional area of the exhaust flow path is disposed between the first provisional flow path PX and the second provisional flow path PY. More specifically, as shown in FIG. 5, the concave sections are formed between the strut front edge 12c and the strut rear edge 12d and between the manhole front edge 13c and the manhole rear edge 13d such that the trajectory of the variation in cross-sectional area of the exhaust flow path P is disposed between the first provisional flow path PX and the second provisional flow path PY.

As shown in FIG. 4, the variation in cross-sectional area of the exhaust flow path P is as follows.

First, a cross-sectional area of the exhaust flow path P is increased according to an increase in diameter of the inner circumference wall surface 10b of the turbine 4 in accordance with a positional variation from an inlet section of the exhaust gas E to the downstream-side. After that, upon arriving at the upstream concave section forming region 20, an increment in cross-sectional area by the upstream concave section is added to an increment in cross-sectional area by an increase in diameter of the inner circumference wall surface 10b, and an increasing rate of the cross-sectional area is increased. Next, upon arriving at the strut front edge 12c, a decrement in cross-sectional area of the exhaust flow path P occupied by the strut 12 is larger than an increment in cross-sectional area by an increase in diameter of the upstream concave section and the inner circumference wall surface 10b, and an increasing rate of the cross-sectional area is converted into a negative value. Then, after the cross-sectional area of the exhaust flow path P is reduced to a position near a center in the main stream direction of the strut 12, a reversed trajectory is presented, and the cross-sectional area is increased. Upon arriving at the strut rear edge 12d, a decrement in cross-sectional area of the upstream concave section is larger than an increment in cross-sectional area by an increase in diameter of the inner circumference wall surface 10b to smoothly reduce the cross-sectional area of the exhaust flow path P, and then it becomes a trajectory of only an increment in cross-sectional area by an increase in diameter of the inner circumference wall surface 10b again.

The case of the downstream concave section forming region 30 is also the same as above.

Next, an operation of the exhaust diffuser 10 having the above-mentioned configuration will be described.

As shown in FIG. 2, the combustion gas G passing through the moving turbine blade 4c of the final stage enters the exhaust flow path P. Since the exhaust flow path P is gradually increased in diameter as it advances to the downstream side, a dynamic pressure of the exhaust gas E is converted into a static pressure.

The exhaust gas E arriving at the most upstream side of the upstream concave section forming region 20 flows toward the strut 12 of the downstream side. Here, while a pressure distribution in which a pressure is gradually increased as it advances toward the strut front edge 12c due to collision of the exhaust gas E is formed at the upstream side in the main stream direction of the strut front edge 12c, a pressure gradient becomes gently formed by an increase in cross-sectional area of the exhaust flow path P by the upstream-side inner circumference concave section 21 and the upstream-side outer circumference concave section 22.

When the exhaust gas E arrives at the strut front edge 12c, since the strut 12 occupies a portion in the cross section of the exhaust flow path P, the cross-sectional area of the exhaust flow path P is reduced. The decrement in cross-sectional area of the exhaust flow path P is maximally increased at a position near a center in the main stream direction, in other words, at a position at which a blade thickness of the strut 12 is maximized as a cross-sectional shape of an aerofoil profile, and then gently increased.

Here, as shown in FIGS. 4 and 5, the decrement in cross-sectional area of the exhaust flow path P is offset by the increment in cross-sectional area of the upstream-side outer circumference concave section 22 and the upstream-side inner circumference concave section 21, and in comparison with the second provisional flow path PY, the variation in cross-sectional area of the exhaust flow path P is attenuated. For this reason, as a pressure fluctuation of the exhaust gas E is attenuated, and a pressure loss generated at the exhaust gas E is reduced.

When the exhaust gas E flows from the strut rear edge 12d to the downstream side, the decrement in cross-sectional area of the upstream-side inner circumference concave section 21 and the upstream-side outer circumference concave section 22 is larger than the increment in cross-sectional area by the increase in diameter of the inner circumference wall surface 10b, and the cross-sectional area of the exhaust flow path P is gently reduced and then increased by the increase in diameter of the inner circumference wall surface 10b. Even at this time, the cross-sectional area of the exhaust flow path P is gently varied. For this reason, the pressure fluctuation of the exhaust gas E is relatively attenuated, and the pressure loss generated at the exhaust gas E is reduced.

Similarly, even when the exhaust gas E passes through the manhole 13 (the downstream concave section forming region 30), the generated pressure loss is reduced by the same action as when passing through the strut 12 (the upstream concave section forming region 20).

As described above, according to the exhaust diffuser 10 of the embodiment of the present invention, since the upstream-side inner circumference concave section 21 is formed in the inner circumference wall surface 10b and the upstream-side outer circumference concave section 22 is formed in the outer circumference wall surface 11b throughout the upstream concave section forming region 20 including the strut 12 in the main stream direction, in comparison with the second provisional flow path PY in which the upstream-side inner circumference concave section 21 and the upstream-side outer circumference concave section 22 are not formed, the cross-sectional area of the exhaust flow path P is increased in proportion to the upstream-side inner circumference concave section 21 and the upstream-side outer circumference concave section 22.

That is, at least a portion of the decrement in cross-sectional area by the strut 12 can be offset by the increment in cross-sectional area by the upstream-side inner circumference concave section 21 and the upstream-side outer circumference concave section 22. Accordingly, since the variation in cross-sectional area of the exhaust flow path P is attenuated in comparison with the second provisional flow path PY, generation of the pressure loss of the exhaust gas E can be suppressed.

Further, in the upstream side and downstream side of the strut 12 in the main stream direction, in comparison with the second provisional flow path PY, since the cross-sectional area of the exhaust flow path P is increased, an influence on the pressure variation in the strut front edge 12c and the strut rear edge 12d can be attenuated.

Since the upstream-side inner circumference concave section 21 and the upstream-side outer circumference concave section 22 are formed to include a position at which the strut 12 extends in the flow path cross section, a cross-sectional area of a partial region in which the strut 12 in the flow path cross section is included can be increased. Accordingly, in the flow path cross section, in comparison with the case in which the upstream-side inner circumference concave section 21 and the upstream-side outer circumference concave section 22 are formed at a position spaced apart from the strut 12 in the circumferential direction, since the fluid colliding with the strut 12 can rapidly escape to the upstream-side inner circumference concave section 21 and the upstream-side outer circumference concave section 22, the pressure loss can be effectively reduced.

Further, in the upstream side of the strut front edge 12c and the downstream side of the strut rear edge 12d in the main stream direction, in comparison with the case in which the second provisional flow path PY is not formed, since the cross-sectional area of the flow path is partially increased, the influence on the pressure variation in the strut front edge 12c and the strut rear edge 12d can be largely attenuated.

In addition, the upstream-side inner circumference concave section 21 and the upstream-side outer circumference concave section 22 are formed such that a portion of a center of the trajectory of the variation in cross-sectional area of the exhaust flow path P is disposed between the trajectory of the variation in cross-sectional area of the first provisional flow path PX and the trajectory of the variation in cross-sectional area of the second provisional flow path PY in a range in which the strut 12 extends in the main stream direction, the variation in cross-sectional area of the exhaust flow path P becomes similar to the variation in cross-sectional area of the first provisional flow path PX, and the pressure loss can be effectively suppressed.

In addition, since the upstream-side inner circumference concave section 21 and the upstream-side outer circumference concave section 22 are formed at a range from a position of the upstream side spaced a distance of 0.2 L from the strut front edge 12c to a position of the downstream side spaced a distance of 0.2 L from the strut rear edge 12d, the pressure loss can be more effectively suppressed.

Figure 6:
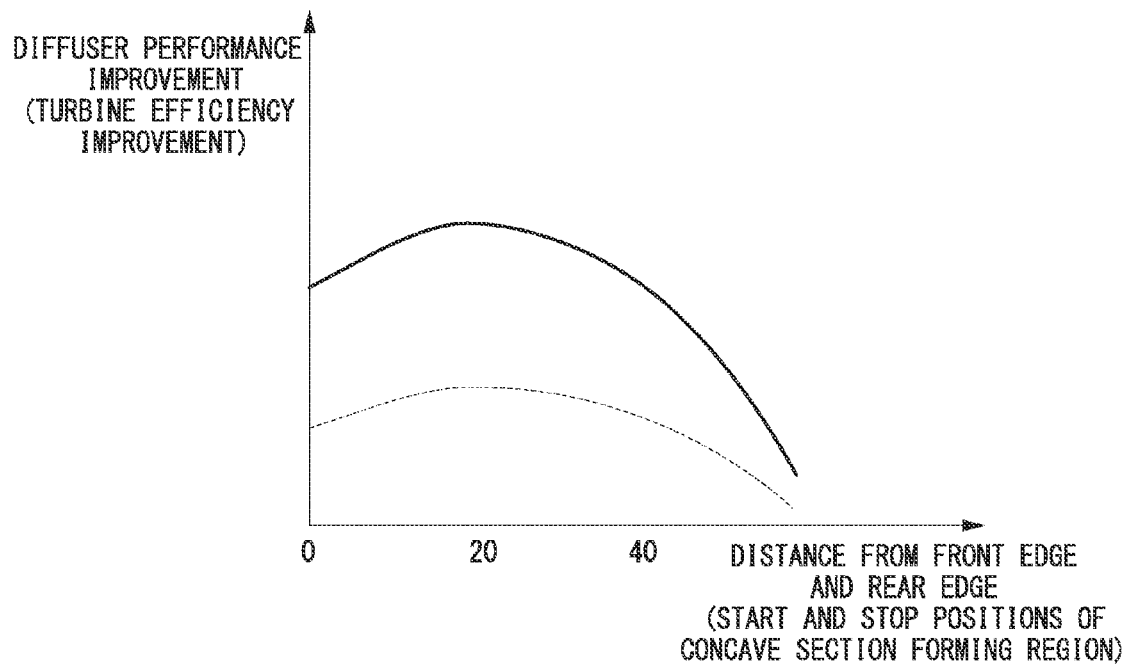
FIG. 6 is a view for describing an effect of the exhaust diffuser 10 according to the embodiment of the present invention, a horizontal axis representing a start position and an end position of a concave section forming region and a vertical axis representing a diffuser performance improvement quantity.

FIG. 6 is a correlation diagram between a concave section forming region and a diffuser performance improvement quantity. In FIG. 6, a start position of the upstream side and an end position of the downstream side of the upstream concave section forming region 20 are varied to check the diffuser performance improvement quantity and results thereof are shown.

As shown in FIG. 6, when the start position of the upstream side and the end position of the downstream side of the upstream concave section forming region 20 are increased, the positions are gently increased to be maximally increased at a position near 0.2 L1. Then, the positions are gently lowered, and the diffuser performance improvement quantity is reduced from a position near 0.4 L1.

As described above, since the upstream-side inner circumference concave section 21 and the upstream-side outer circumference concave section 22 are formed at a range from a position of the upstream side spaced a distance of 0.2 L1 from the strut front edge 12c to a position of the downstream side spaced a distance of 0.2 L1 from the strut rear edge 12d, the diffuser performance can be largely improved, and performance of the gas turbine can be improved.

Even in the manhole 13 in which the downstream concave section forming region 30 is disposed, since the same effect as the upstream-side inner circumference concave section 21 and the upstream-side outer circumference concave section 22 is accomplished by the downstream-side inner circumference concave section 31 and the downstream-side outer circumference concave section 32, the pressure loss can be effectively suppressed.

As described above, while the exemplary embodiment of the present invention has been described, the present invention is not limited to the embodiment. Addition, omission, substitution, and the other modifications of components can be made without departing from the scope of the present invention.

For example, in the above-mentioned embodiment, while the upstream concave sections (the upstream-side inner circumference concave section 21 and the upstream-side outer circumference concave section 22) and the downstream concave sections (the downstream-side inner circumference concave section 31 and the downstream-side outer circumference concave section 32) are formed at the diffuser, these sections may be formed at any one side of the upstream concave section and the downstream concave section. In addition, the concave section forming region may be formed at only one side of the inner circumference wall surface 10b and the outer circumference wall surface 11b.

Further, in the above-mentioned embodiment, while the upstream-side inner circumference concave section 21 and the upstream-side outer circumference concave section 22 are formed at a range from a position of the upstream side spaced a distance of 0.2 L1 from the strut front edge 12c to a position of the downstream side spaced a distance of 0.2 L1 from the strut rear edge 12d, as shown in FIG. 6, when the range is a range to a position spaced a distance of 0.4 L1 therefrom, a good diffuser performance improvement quantity is recognized. Accordingly, the upstream-side inner circumference concave section 21 and the upstream-side outer circumference concave section 22 may be formed at a range from a position of the upstream side spaced a distance of 0.4 L1 from the strut front edge 12c to a position of the downstream side spaced a distance of 0.4 L1 from the strut rear edge 12d. The downstream-side inner circumference concave section 31 and the downstream-side outer circumference concave section 32 are the same as above.

Figure 7:
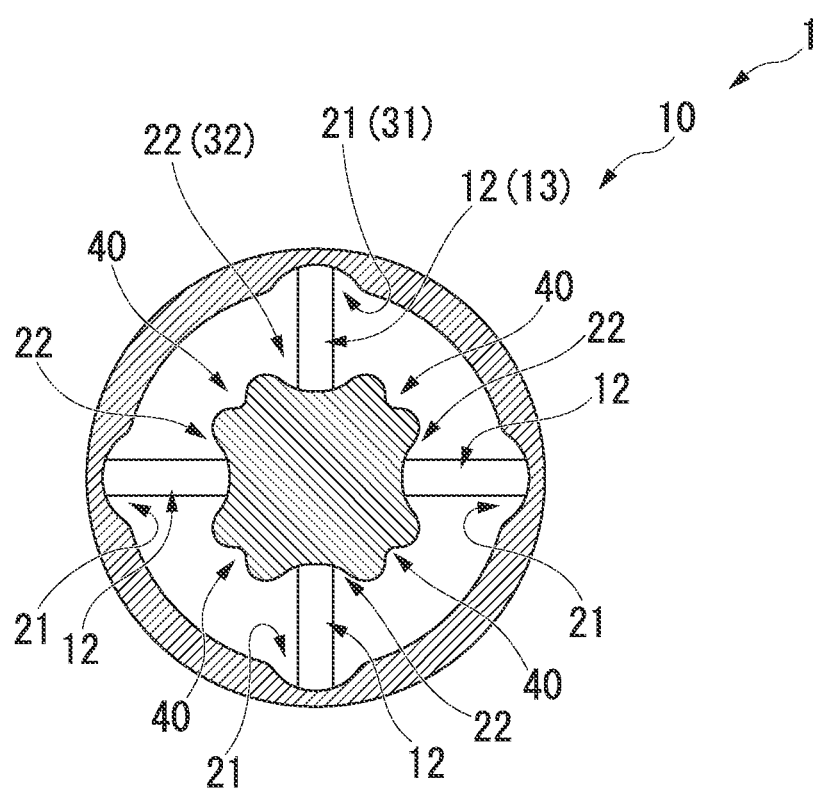
FIG. 7 is an enlarged cross-sectional view of a major part of a variant of the exhaust diffuser 10 according to the embodiment of the present invention, showing a view corresponding to FIG. 3.

In addition, in the above-mentioned embodiment, in the flow path cross section, while the upstream-side inner circumference concave section 21 and the upstream-side outer circumference concave section 22 are formed to include a position from which the strut 12 extends and the downstream-side inner circumference concave section 31 and the downstream-side outer circumference concave section 32 are formed to include a position from which the manhole 13 extends, as shown in FIG. 7, in the flow path cross section, at least one concave section 40 may be formed in a range that does not include the strut 12 or the manhole 13.

In the concave section 40, as shown in FIG. 7, at least one of the outer circumference wall surface 11b and the inner circumference wall surface 10b may be formed, or both of them may be formed.

In addition, in the upstream concave section forming region 20, only the concave section 40 may be formed instead of the upstream-side inner circumference concave section 21 and the upstream-side outer circumference concave section 22. Similarly, in the downstream concave section forming region 30, only the concave section 40 may be formed instead of the downstream-side inner circumference concave section 31 and the downstream-side outer circumference concave section 32.

Further, in the above-mentioned embodiment, while the case in which the flow path structure of the present invention is applied to the exhaust diffuser 10 of the gas turbine 1 has been described, the flow path structure of the present invention may be applied to another portion of the gas turbine 1 (for example, a suction flow path of the air A of the compressor, or the like), or other fluid machinery.

REFERENCE SIGNS LIST

1 . . . gas turbine,
10 . . . exhaust diffuser,
10b . . . inner circumference wall surface (wall surface),
11b . . . outer circumference wall surface (wall surface),
12 . . . strut (structure),
12c . . . strut front edge (front edge),
12d . . . strut rear edge (rear edge),
13 . . . manhole (structure),
13c . . . manhole front edge (front edge),
13d . . . manhole rear edge (rear edge),
20 . . . upstream concave section forming region (concave section forming region), 21 . . . upstream-side inner circumference concave section (concave section),
22 . . . upstream-side outer circumference concave section (concave section),
30 . . . downstream concave section forming region (concave section forming region),
31 . . . downstream-side inner circumference concave section (concave section),
32 . . . downstream-side outer circumference concave section (concave section),
40 . . . concave section,
E . . . exhaust gas (fluid),
P . . . exhaust flow path

The invention claimed is:

1. An exhaust diffuser of a gas turbine comprising:
a wall surface in which an annular flow path is formed;
a structure configured to extend in a direction intersecting a main stream direction of a fluid flowing through the flow path from the wall surface; and
a concave section forming region formed throughout a range comprising the structure in the main stream direction and in a circumferential direction of the wall surface and having a concave section formed in the wall surface,
wherein the concave section, in a flow path cross section, gradually deepens and then gradually becomes shallow from one side toward the other side in the circumferential direction, and
the concave section, in the flow path cross section, is configured to be the deepest in the circumferential direction of the flow path at a position from which the structure of the wall surface extends, and
wherein, as the structure occupies a partial range of the flow path in the flow path cross section intersecting the main stream, a cross-sectional area of the flow path is varied in accordance with positional variation in the main stream direction.

2. The exhaust diffuser according to claim 1, wherein the concave section is configured such that a portion of a trajectory of a variation in cross-sectional area of the flow path in accordance with positional variation in the main stream direction within a range where the structure is provided is disposed between a trajectory of the variation in cross-sectional area of the flow path in case that the structure and the concave section are not prepared and a trajectory of the variation in cross-sectional area of the flow path in case that the concave section is not prepared.

3. The exhaust diffuser according to claim 2, wherein the concave section is formed at a range from a position of an upstream side spaced a distance of 0.4 L from a front edge to a position of a downstream side spaced a distance of 0.4 L from a rear edge when a length from the front edge to the rear edge of the structure in the main stream direction is L.

4. The exhaust diffuser according to claim 3, wherein the concave section is formed at a range from a position of the upstream side spaced a distance of 0.2 L from the front edge and a position of the downstream side spaced a distance of 0.2 L from the rear edge.

5. The exhaust diffuser according to claim 1, wherein the concave section is formed at a range from a position of an upstream side spaced a distance of 0.4 L from a front edge to a position of a downstream side spaced a distance of 0.4 L from a rear edge when a length from the front edge to the rear edge of the structure in the main stream direction is L.

6. The exhaust diffuser according to claim 5, wherein the concave section is formed at a range from a position of the upstream side spaced a distance of 0.2 L from the front edge and a position of the downstream side spaced a distance of 0.2 L from the rear edge.

7. The exhaust diffuser according to claim 1, wherein
the concave section forming region includes two regions that are an upstream concave section forming region and a downstream concave section forming region being in a position downstream of the upstream concave section forming region.

8. The exhaust diffuser according to claim 7, further comprising:
an exhaust casing connected to a turbine casing; and
a protection casing installed in the exhaust casing,
wherein the structure includes:
a plurality of struts extending from the exhaust casing to the inside of the protection casing; and
a manhole disposed at a downstream side of the plurality of struts, and
wherein the upstream concave section forming region covers a range in which the plurality of struts is provided, and
the downstream concave section forming region covers a range in which the manhole is provided.

* * * * *